United States Patent Office 3,249,585
Patented May 3, 1966

3,249,585
PREPARATION OF SILOXANES WITH SiH BONDS WITH AN ALKYL LITHIUM CATALYST
Forrest O. Stark and George E. Vogel, Midland, Mich., assignors to Dow Corning Corporation, Midland, Mich., a corporation of Michigan
No Drawing. Filed Apr. 29, 1964, Ser. No. 363,618
6 Claims. (Cl. 260—46.5)

This application relates to a method of making linear siloxane polymers which contain silicon-bonded hydrogen.

The common way of making linear siloxane polymers is by means of the hydrolysis and condensation of silanes. This reaction, of course, either requires the presence of water or forms water as a byproduct. Water in the presence of acids or bases cleaves silicon-hydrogen bonds. It is therefore difficult to make high molecular weight linear siloxane polymers which contain appreciable amounts of silicon-hydrogen bonds.

An advantage of the process of this invention is that it can be carried out under anhydrous conditions, thereby avoiding cleavage of the silicon-hydrogen bonds.

This application relates to the process of making linear siloxane polymers containing

units comprising contacting a cyclic compound of the formula

where $x$ is an integer of 3 to 6, with a catalytic amount of an alkyl lithium compound, where R is selected from the group consisting of (1) monovalent hydrocarbon radicals free of aliphatic unsaturation and (2)

$$-CH_2CH_2R'$$

radicals where R' is a perfluoroalkyl radical.

R can be any monovalent hydrocarbon radical free of aliphatic unsaturation such as methyl, ethyl, 2-ethylhexyl, decyl, octadecyl, cyclohexyl, phenyl, benzyl, xenyl and tolyl. R' can be any monovalent perfluoroalkyl radical, preferably of less than 9 carbon atoms, such as trifluoromethyl, perfluoroethyl, perfluoroheptyl perfluorooctadecyl, perfluoroisopropyl, or perfluorooctyl.

The alkyl lithium compound can be any compound such as ethyl lithium, isopropyl lithium, n-butyl lithium, isobutyl lithium, t-butyl lithium, 1,8-octyl dilithium, 1,7,18-octadecyl trilithium, or decyl lithium.

The cyclic reactants of the process of this application are well known to the art.

Homopolymers and copolymers can be made by the process of this application.

For example, homopolymers containing

units can be made by adding an alkyl lithium compound to pure cyclic

where the symbols are defined above.

Copolymers can be made by polymerizing different species of

with an alkyl lithium compound and/or adding to the reaction mixture other cyclic siloxanes for copolymerization such as hexamethylcyclotrisiloxane, tetraphenyltetramethylcyclotetrasiloxane, or tris(3,3,3-trifluoropropyl)trimethylcyclotrisiloxane.

Any 3, 4, 5, or 6 membered cyclic siloxane, with substituents which are not reactive with the SiH bond, are suitable for copolymerization with the above-described cyclic siloxanes, and will be copolymerized under the same conditions as the above cyclic siloxanes.

The alkyl lithium compound is an effective catalyst in very small proportions; the smaller the quantity of catalyst present, the higher the molecular weight of the product will be. If equimolar amounts of the catalyst and reactant are mixed, the cyclic siloxanes will open to become linear siloxanes, but they will not further polymerize. It is therefore preferred to employ from 50 to 0.001 mol percent of catalyst in the reaction, based on the weight of the cyclic reactant.

The reaction temperature is not critical, though it is preferred to run the reaction from 50 to 175° C. The reaction is operative at all temperature ranges, limited only by the decomposition temperature of the alkyl lithium compound. At low temperatures, the reaction is generally inconveniently slow.

The alkyl lithium can be conveniently added as a solution in an inert, organic solvent such as hexane, to insure rapid, even dispersion in the siloxane reactant.

The reaction of this application is best carried out under anhydrous conditions in order to avoid the decomposition of the SiH bonds present in the polymeric product.

Long chain linear polymers containing SiH linkages and with high viscosities can be made by the process of this invention.

The following examples are illustrative only and should not be construed as limiting the invention, which is properly delineated in the appended claims.

Example 1

0.25 ml. of 2 molar n-butyl lithium in hexane were added to 50 ml. of tetramethylcyclotetrasiloxane [CH$_3$(H)SiO]$_4$, and the mixture was sealed in a bottle heated for one hour at 110° C. After cooling to room temperature a high polymer gum was recovered. The gum was completely soluble in dry toluene, indicating that the product was a linear (not crosslinked) polymer consisting essentially of

units.

Example 2

2 ml. of 2 molar n-butyl lithium in hexane were added to 20 ml. of hexamethylcyclohexasiloxane, and the mixture was sealed in a bottle and heated for one hour at 110° C. After cooling, it was noted that the viscosity of the reaction mixture had increased, indicating that a linear polymer consisting essentially of

units had been formed.

Example 3

Three drops of a 1.7 N pentane solution of t-butyl lithium were added to each of three bottles. Bottle No. 1 contained cyclic $(CH_3HSiO)_4$; bottle No. 2 contained cyclic $(CH_3HSiO)_5$; and bottle No. 3 contained cyclic $(CH_3HSiO)_6$; each in the amount of 15 cc.

The bottles were sealed and heated at 100° C. for an hour.

In each bottle, the viscosity of the contents increased to 300 cs., measured at room temperature. The product in each case was a homopolymer consisting essentially of $(CH_3HSiO)$ units.

Example 4

When 20 g. of tris-(3,3,3-trifluoropropyl)-cyclotrisiloxane are mixed at 70° C. with 0.01 weight percent of 1,10-decyldilithium, a linear polymer containing 3,3,3-trifluoropropylhydrogensiloxy units is obtained.

Example 5

When 5 g. of tetraphenylcyclotetrasiloxane plus 10 g. of hexamethylcyclotrisiloxane are mixed with 0.6 gram of isopropyl lithium at 100° C., a linear copolymer consisting essentially of phenylhydrogensiloxy units and dimethylsiloxy units is formed.

Example 6

When 5 g. of

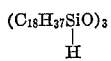

is mixed with 10 g. of

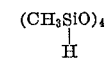

and 0.1 gram of secondary butyl lithium at 110° C., a copolymer consisting essentially of

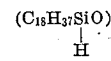

units and

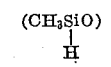

units is formed.

That which is claimed is:

1. The process of making linear siloxane polymers containing

units comprising contacting a cyclic compound of the formula

where $x$ is an integer of 3 to 6, with a catalytic amount of an alkyl lithium compound, where R is selected from the group consisting of
   (1) monovalent hydrocarbon radicals free of aliphatic unsaturation and
   (2) $-CH_2CH_2R'$ radicals where R' is a monovalent perfluoroalkyl radical.

2. The process of claim 1 where the catalyst is n-butyl lithium.

3. The process of claim 1 where the catalyst is t-butyl lithium.

4. The process of making a linear siloxane homopolymer containing

units comprising contacting a cyclic compound of the formula

where $x$ is an integer of 3 to 6, with a catalytic amount of an alkyl lithium compound, where R is selected from the group consisting of
   (1) monovalent hydrocarbon radicals free of aliphatic unsaturation and
   (2) $-CH_2CH_2R'$ radicals where R' is a monovalent perfluoroalkyl radical.

5. The process of claim 4 where the catalyst is n-butyl lithium.

6. The process of claim 4 where the catalyst is t-butyl lithium.

No references cited.

LEON J. BERCOVITZ, *Primary Examiner.*